US012710163B1

(12) United States Patent
Zheng

(10) Patent No.: US 12,710,163 B1
(45) Date of Patent: Aug. 18, 2026

(54) PUSH-PULL PLUG-IN LAMP PANEL STRUCTURE AND CEILING FAN LIGHT COMPRISING THE STRUCTURE

(71) Applicant: JOININ GLOBAL PTE. LTD., Singapore (SG)

(72) Inventor: Hongbing Zheng, Hangzhou (CN)

(73) Assignee: JOININ GLOBAL PTE.LTD. (SG)

( * ) Notice: Subject to any disclaimer, the term of this patent is extended or adjusted under 35 U.S.C. 154(b) by 0 days.

(21) Appl. No.: 19/256,096

(22) Filed: Jun. 30, 2025

(30) Foreign Application Priority Data

May 16, 2025 (CN) ........................ 202520975227.1

(51) Int. Cl.

| | |
|---|---|
| ***F21V 21/088*** | (2006.01) |
| ***F21V 17/16*** | (2006.01) |
| ***F21V 23/06*** | (2006.01) |
| ***F21V 33/00*** | (2006.01) |

(52) U.S. Cl.
CPC .......... *F21V 21/088* (2013.01); *F21V 17/164* (2013.01); *F21V 23/06* (2013.01); *F21V 33/0096* (2013.01)

(58) Field of Classification Search
CPC ...... F21V 21/088; F21V 17/164; F21V 23/06; F21V 33/0096
See application file for complete search history.

(56) References Cited

U.S. PATENT DOCUMENTS

| | | | | |
|---|---|---|---|---|
| 5,151,011 | A * | 9/1992 | Rezek | F21V 33/0096 416/5 |
| 5,270,905 | A * | 12/1993 | Trevino | F21V 15/04 362/267 |
| 6,322,232 | B1 * | 11/2001 | Oliver | F21S 8/04 362/147 |
| 11,506,377 | B1 * | 11/2022 | Wang | F21V 21/03 |
| 2015/0330619 | A1 * | 11/2015 | Iwamoto | F21V 29/773 416/5 |
| 2016/0169503 | A1 * | 6/2016 | Chen | F04D 25/088 362/382 |
| 2017/0108184 | A1 * | 4/2017 | Brannon | F21V 23/06 |
| 2018/0372278 | A1 * | 12/2018 | Zhang | F21K 9/237 |
| 2019/0309761 | A1 * | 10/2019 | Wang | F04D 25/088 |
| 2020/0173446 | A1 * | 6/2020 | Horng | F21V 21/096 |
| 2023/0077609 | A1 * | 3/2023 | Zhang | F04D 29/34 416/204 R |

* cited by examiner

*Primary Examiner* — Bryon T Gyllstrom
(74) *Attorney, Agent, or Firm* — IPRTOP LLC

(57) ABSTRACT

The present disclosure discloses a push-pull plug-in lamp panel structure and a ceiling fan light comprising the structure. The structure comprises: a lampshade assembly and a motor assembly. The motor assembly comprises: a motor component and a connecting plate. The connecting plate is fixedly connected beneath the motor component and is push-pull snap-fitted to the lampshade assembly. A first guide rail connector is provided on an edge of the connecting plate, and a second guide rail connector corresponding to the first guide rail connector is provided on an upper surface of the lampshade assembly. The present disclosure adopts the design of the push-pull snap-fit structure between the motor assembly and the lampshade assembly, which eliminates the need for additional wiring, avoids the complexity of screw-based installation and the risk of detachment in threaded installation, thus enabling easy installation and high overall strength.

9 Claims, 6 Drawing Sheets

PUSH-PULL PLUG-IN LAMP PANEL STRUCTURE AND CEILING FAN LIGHT COMPRISING THE STRUCTURE

FIELD OF TECHNOLOGY

The present disclosure relates to the technical field of fans, and in particular to a push-pull plug-in lamp panel structure and a ceiling fan light comprising the structure.

BACKGROUND

As a household item with both lighting and ventilation functions, the ceiling fan light is widely used in various settings such as homes and offices. Currently, there are two common installation methods for ceiling fan lights on the market: rotating installation and screw-based installation.

The rotating installation involves fixing the ceiling fan light by rotating a component of it at a certain angle. However, this installation method has significant defects. On one hand, due to the lack of precise limiting devices, it is easy to over-rotate during the rotation process, causing the component to be improperly installed and requiring readjustment, which increases the complexity and time cost of installation. On the other hand, the component installed by rotating may become loose or even detach due to vibration and other factors during long-term use, posing a safety hazard to users and affecting the normal use of the ceiling fan light.

The screw-based installation involves fixing various components of the ceiling fan light with screws. Although this method is relatively more secure, it is more complex and requires the use of tools to tighten each screw individually. This not only makes the process inconvenient, but issues such as screw slippage and uneven tightening force can occur during installation, affecting the installation quality. Furthermore, screw-based installation also requires pre-drilled screw holes on the installation components, which may impose certain limitations on the appearance design of the product.

Regardless of whether rotating installation or screw-based installation is used, both methods face the issue of wire connections. During installation, a plurality of wires, such as power cables and control cables, must be connected. Due to the large number of cables and high density of connection points, the risk of unstable connections increases, causing the ceiling fan light to malfunction or even short circuits and other failures, which can lead to inconvenience and safety concerns for users.

In conclusion, the existing installation methods for the ceiling fan light have issues such as cumbersome installation, unstable connections, and potential safety hazards, which urgently require improvement.

SUMMARY

The present disclosure provides a push-pull plug-in lamp panel structure and a ceiling fan light comprising the structure, which are designed to resolve the issues in the existing ceiling fan light structure. In the installation of the conventional ceiling fan light, the use of rotating installation often leads to over-rotation or detachment, while screw-based installation involves a complicated screw installation process. Both methods involve wiring connection issues, which lead to cumbersome installation and unstable connections.

In the first aspect, the present disclosure provides a push-pull plug-in lamp panel structure and a ceiling fan light comprising the structure. The push-pull plug-in lamp panel structure comprises: a lampshade assembly and a motor assembly. The motor assembly comprises: a motor component and a connecting plate. The connecting plate is fixedly connected beneath the motor component, and the connecting plate is push-pull snap-fitted to the lampshade assembly. A first guide rail connector is provided on an edge of the connecting plate, and a second guide rail connector corresponding to the first guide rail connector is provided on an upper surface of the lampshade assembly. The second guide rail connector of the lampshade assembly is push-pull snap-fitted to the first guide rail connector on the connecting plate, so that the motor assembly and the lampshade assembly are fixed and limited to each other.

In one embodiment of the present disclosure, the lampshade assembly comprises: a lamp panel, a light source, a lampshade, and an annular clip. The light source is fixedly connected to the lamp panel through a clip; the lampshade is fixedly snap-fitted to the lamp panel through the annular clip.

In one embodiment of the present disclosure, male and female pins are provided on a first surface of the lamp panel; the male and female pins comprise: a first end of the male and female pins and a second end of the male and female pins; the first end of the male and female pins is located at a first end of the second guide rail connector, and the second end of the male and female pins are located at a first end of the connecting plate. The second guide rail connector comprises a pair of a first guide rail and a second guide rail. The first guide rail and the second guide rail are spaced apart to form a channel. A first opening end of the channel is provided with the first end of the male and female pins. The first end of the male and female pins is snap-fitted to the second end of the male and female pins.

In one embodiment of the present disclosure, a boss is further provided on the first surface of the lamp panel; at least one boss is provided; the boss is located at a second opening end of the channel; the boss is fixedly snap-fitted to a second end of the connecting plate; the boss, the second guide rail connector, and the male and female pins are all located on the same surface of the lamp panel.

In one embodiment of the present disclosure, a second surface of the lamp panel is provided with a feature fixed to the connecting plate and is provided with a fixed light source connection wire; the fixed light source connecting wire is fixedly connected to the light source.

In one embodiment of the present disclosure, at least one boss is provided;

the boss, the second guide rail connector, and the male and female pins are all located on the same surface of the lamp panel.

In one embodiment of the present disclosure, the first guide rail connector is configured as a guide rail, and the second guide rail connector is configured as a guide groove; or the first guide rail connector is configured as a guide groove, and the second guide rail connector is configured as a guide rail.

In one embodiment of the present disclosure, the motor component and the connecting plate are fixedly connected through a connection pipe; the connecting plate is disposed beneath the motor component and fits closely against the upper surface of the lampshade assembly to form a snap-fit connection with the lampshade assembly.

In one embodiment of the present disclosure, the motor assembly further comprises a controller extension wire; a clip provided at a terminal of the controller extension wire is snap-fitted to a slot inside the connecting plate; a through step is provided outside the connecting plate, and the through step is fixedly connected to the second guide rail connector on the upper surface of the lampshade assembly.

In one embodiment of the present disclosure, the lamp panel is made of ABS material; and the lampshade is made of polystyrene material.

In the second aspect, the present disclosure provides a ceiling fan light, comprising the push-pull plug-in lamp panel structure as described in any embodiment of the first aspect of the present disclosure.

As described above, the push-pull plug-in lamp panel structure and the ceiling fan light comprising the structure described in the present disclosure have the following beneficial effects:

(1) The push-pull plug-in lamp panel structure provided in the present disclosure adopts the design of the push-pull snap-fit structure between the motor assembly and the lampshade assembly. This structure eliminates the need for additional wiring, effectively avoiding the complexity of screw-based installation and the risk of detachment in threaded installation, thus enabling easy installation and high overall strength. Furthermore, the motor extension wire and the light source wire are respectively fixed to the connecting plate and the lamp panel through the clip, preventing the damage caused by unsecured, externally suspended extension wires in existing designs, thereby ensuring the overall strength of the ceiling fan light.

(2) The push-pull plug-in lamp panel structure provided in the present disclosure adopts the male and female pins, which are integrally molded into the corresponding plastic components (two-pin, three-pin, or more), effectively eliminating wiring issues caused by manual pin insertion. Once the lampshade assembly is properly installed, the male and female pins automatically connect to establish an electrical connection without the need for additional wiring, which significantly reduces the complexity of wiring and prevents issues related to poor electrical contact. Additionally, both the male and female connectors are fixed and limited in position, which prevents wire misalignment and interference with other components.

(3) The ceiling fan light comprising the push-pull plug-in lamp panel structure provided by the present disclosure adopts the design of the push-pull snap-fit structure between the lampshade assembly and the motor assembly. This structure eliminates the need for additional wiring, enabling easy installation and high overall strength while avoiding issues caused by unnecessary installation steps and potential damage during transportation. Additionally, it enhances the service life of the ceiling fan light. This design method of the present disclosure not only addresses the issue of cumbersome installation in traditional ceiling fan lights, but also resolves the problem of unstable connections. Furthermore, the structure and accessories of the ceiling fan light offer strong versatility, making them suitable for a wide range of applications.

REFERENCE NUMERALS

Figure 1:
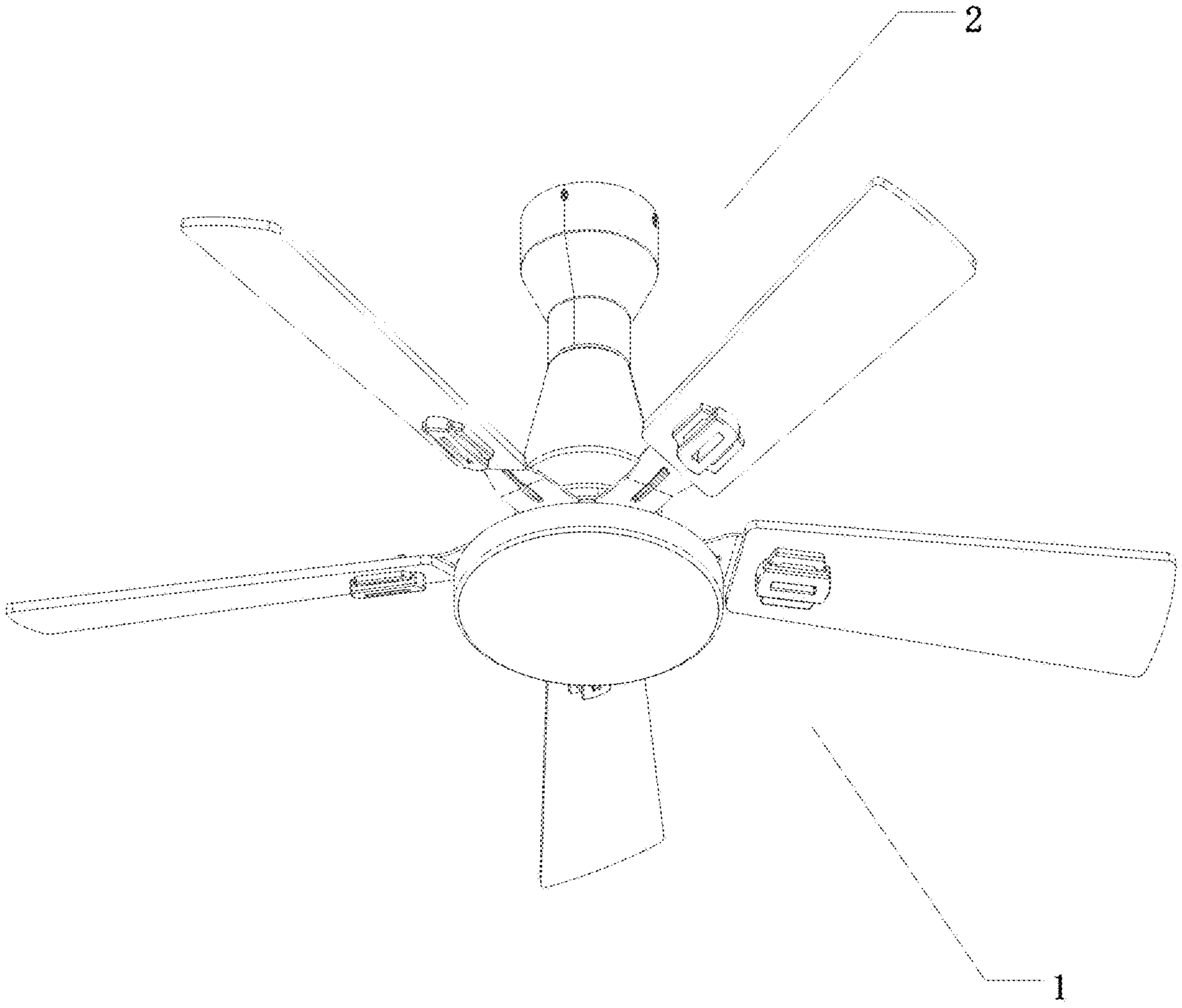
FIG. 1 is a bottom view of a three-dimensional structure of a ceiling fan light according to one embodiment of the present disclosure.
Figure 2:
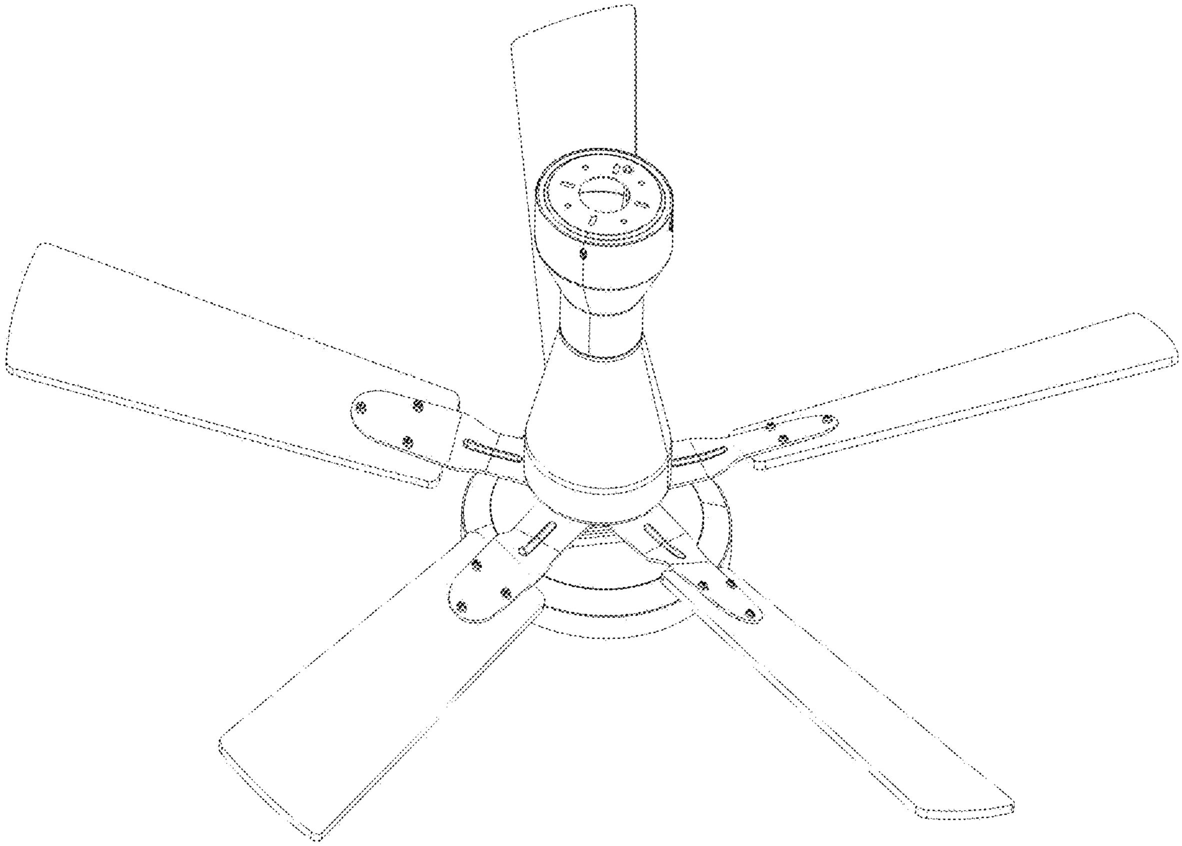
FIG. 2 is a top view of a three-dimensional structure of a ceiling fan light according to one embodiment of the present disclosure.
Figure 3:
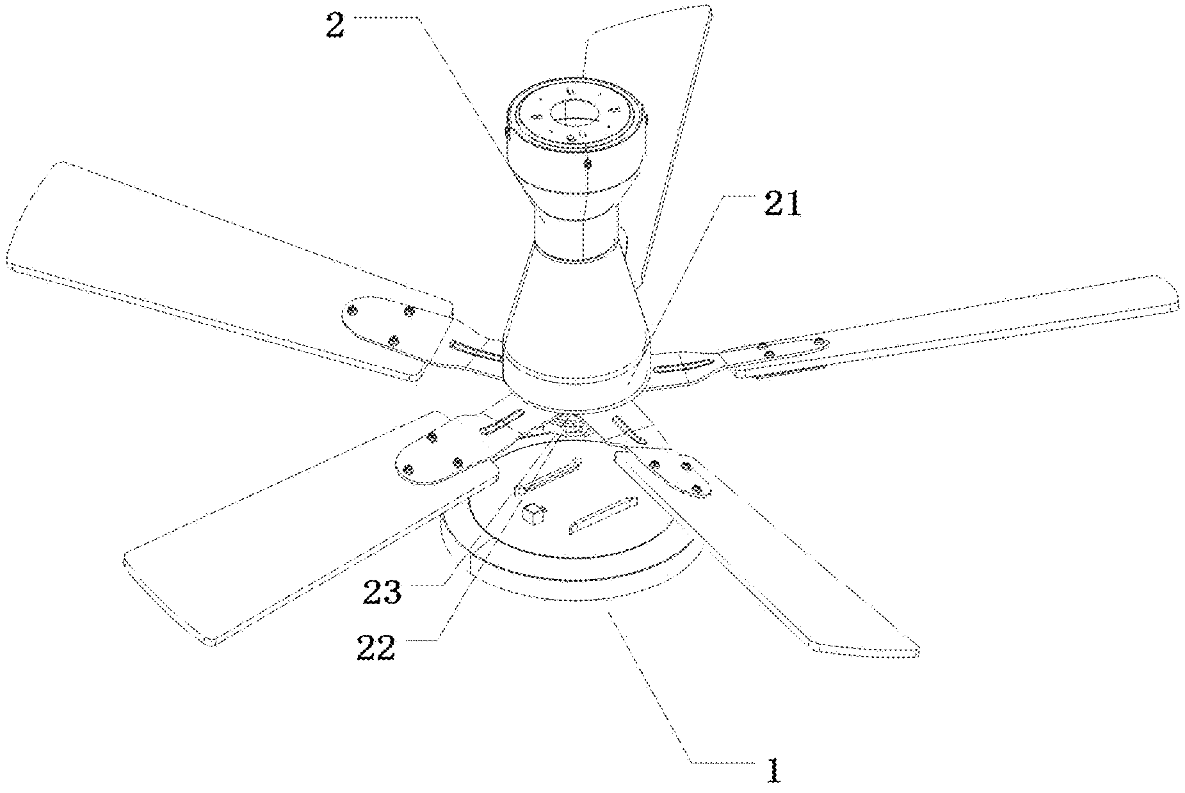
FIG. 3 is an exploded view of a ceiling fan light product according to one embodiment of the present disclosure.
Figure 4:
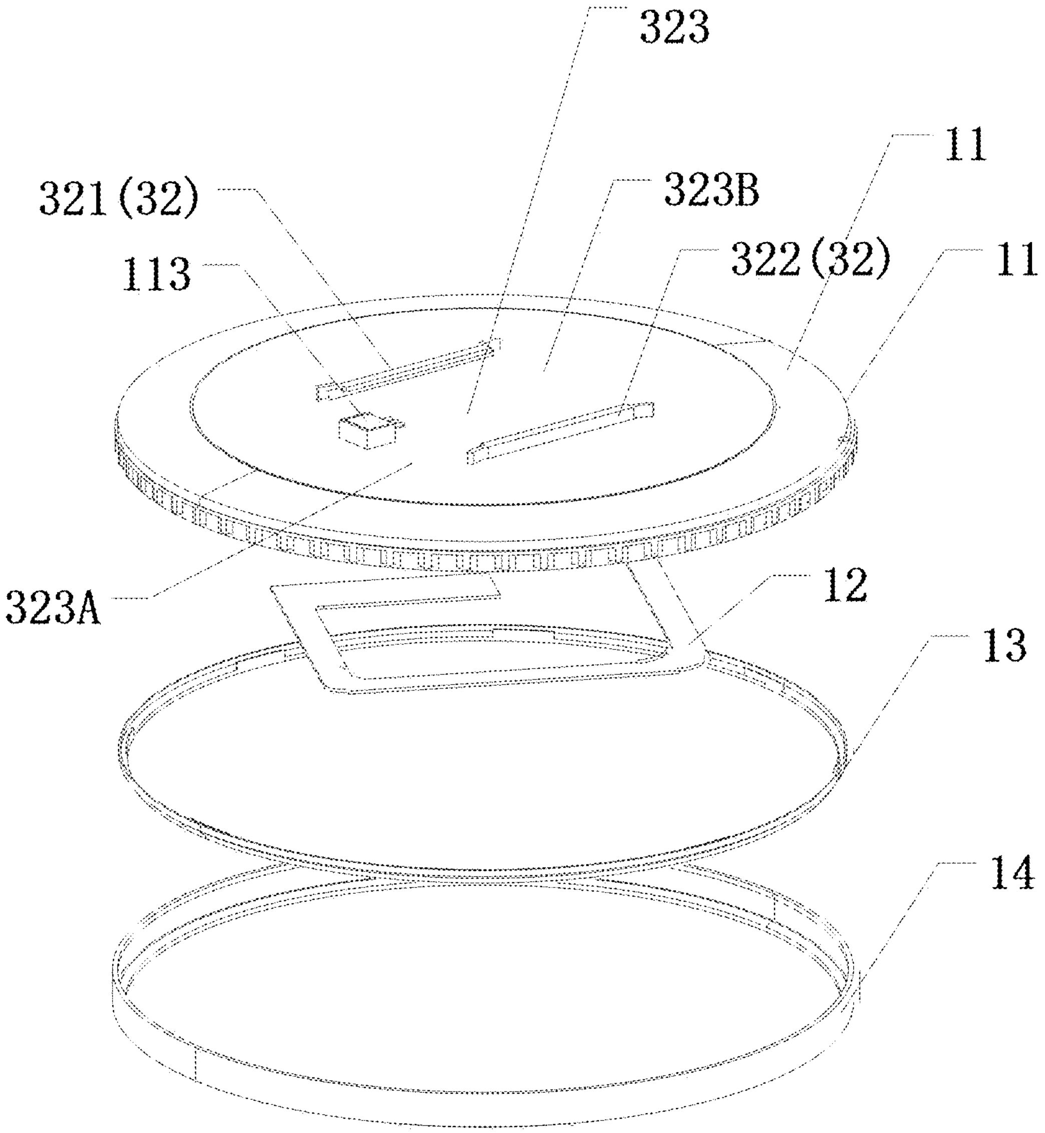
FIG. 4 is an exploded view of a structure of a lampshade assembly according to one embodiment of the present disclosure.

100 Push-pull plug-in lamp panel structure
1 Lampshade assembly
11 Lamp panel
111 First surface of lamp panel
1111 Boss
112 Second surface of lamp panel
113 Male and female pins
113A First end of male and female pins
113B Second end of male and female pins
12 Light source
13 Lampshade
14 Annular clip
2 Motor assembly
21 Motor component
22 Connecting plate
22A First end of connecting plate
22B Second end of connecting plate
23 Connection pipe
24 Controller extension wire
241 Clip
25 Through step
31 First guide rail connector
32 Second guide rail connector
32 First guide rail
322 Second guide rail
333A First end of second guide rail connector
333B Second end of second guide rail connector
323 Channel
323A First opening end of channel
323B Second opening end of channel

DETAILED DESCRIPTION

The present disclosure is further described below in conjunction with the accompanying drawings, but the protection scope of the present disclosure is not limited to the following description.

The embodiments of the present disclosure are described below through specific examples, and those skilled in the art can easily understand other advantages and effects of the present disclosure from the contents disclosed in this specification. The present disclosure can also be implemented or applied through other different specific embodiments, and the details in this specification can also be modified or changed in various ways based on different viewpoints and applications without departing from the spirit of the present disclosure. It should be noted that, where there is no conflict, the following embodiments and features in the embodiments can be combined with each other.

It should be noted that the drawings provided in the following embodiments are intended to illustrate the basic concept of the present disclosure, and thus the drawings only show components related to the present disclosure rather than being drawn according to the number, shape, and size of components in actual implementation. In actual implementation, the type, quantity, and proportion of each component may be arbitrarily changed, and the layout of the components may also be more complicated.

The following embodiments of the present disclosure provide a push-pull plug-in lamp panel structure and a ceiling fan light comprising the structure, which resolve the issues in the existing ceiling fan light structure. In the installation of the conventional ceiling fan light, the use of rotating installation often leads to over-rotation or detachment, while screw-based installation involves a complicated screw installation process. Both methods involve wiring connection issues, which lead to cumbersome installation and unstable connections.

The embodiments of the present disclosure provide a push-pull plug-in lamp panel structure and a ceiling fan light comprising the structure, which adopt the design of the push-pull snap-fit structure between the motor assembly and the lampshade assembly. This structure eliminates the need for additional wiring, effectively avoiding the complexity of screw-based installation and the risk of detachment in threaded installation, thus enabling easy installation and high overall strength. Furthermore, the motor extension wire and the light source wire are respectively fixed to the connecting plate and the lamp panel through the clips, preventing the damage caused by unsecured, externally suspended extension wires in existing designs, thereby ensuring the overall strength of the ceiling fan light and improving the service life of the ceiling fan light. The push-pull plug-in lamp panel structure provided in the present disclosure adopts the male and female pins, which are integrally molded into the corresponding plastic components (two-pin, three-pin, or more), effectively eliminating wiring issues caused by manual pin insertion. Once the lampshade assembly is properly installed, the male and female pins automatically connect to establish an electrical connection without the need for additional wiring, which significantly reduces the complexity of wiring and prevents issues related to poor electrical contact. Additionally, both the male and female connectors are fixed and limited in position, which prevents wire misalignment and interference with other components and improves the service life of the ceiling fan light. This design method of the present disclosure not only addresses the issue of cumbersome installation in traditional ceiling fan lights, but also resolves the problem of unstable connections.

The following provides a detailed description of an embodiment of the push-pull plug-in lamp panel structure, the ceiling fan light comprising the structure, and their operational principles with reference to the accompanying drawings.

Please refer to FIGS. 1-7, which respectively show a bottom view of a three-dimensional structure of a ceiling fan light according to the embodiments of the present disclosure, a top view of a three-dimensional structure of a ceiling fan light according to the embodiments of the present disclosure, an exploded view of a ceiling fan light product according to the embodiments of the present disclosure, an exploded view of a structure of a lampshade assembly according to the embodiments of the present disclosure, a bottom view of an appearance structure of a connecting plate according to an embodiment of the present disclosure, a top view of an appearance structure of a connecting plate according to an embodiment of the present disclosure, and a top view of an appearance structure of a lamp panel according to an embodiment of the present disclosure. As shown in FIGS. 1-4, a push-pull plug-in lamp panel structure 100 comprises: a lampshade assembly 1 and a motor assembly 2.

In one embodiment, the motor assembly 2 comprises: a motor component 21 and a connecting plate 22. The connecting plate 22 is fixedly connected beneath the motor component 21, and the connecting plate 22 is push-pull snap-fitted to the lampshade assembly 1.

A first guide rail connector 31 is provided on an edge of the connecting plate 22, and a second guide rail connector 32 corresponding to the first guide rail connector 31 is provided on an upper surface of the lampshade assembly 1; the second guide rail connector 32 of the lampshade assembly 1 is push-pull snap-fitted to the first guide rail connector 31 on the connecting plate 22, so that the motor assembly 2 and the lampshade assembly 1 are fixed and limited to each other.

Specifically, the first guide rail connector 31 is provided at the edge of the connecting plate 22, and the second guide rail connector 32 is provided on the upper surface of the lampshade assembly 1. The first guide rail connector 31 and the second guide rail connector 32 can cooperate to perform a push-pull snap-fit action. This structure allows for installation through the push-pull sliding mechanism between the lampshade assembly 1 and the motor assembly 2, avoiding the complexity of screw-based installation and the risk of detachment in threaded installation. The structure is easy to install and ensures stability.

In this embodiment, preferably, the interlocking of the first guide rail connector 31 and the second guide rail connector 32 is achieved using a guide rail and a guide groove as an example. Accordingly, there are multiple options for the structure of the first guide rail connector 31 and the second guide rail connector 32. That is, the first guide rail connector 31 is configured as a guide rail, and the second guide rail connector 32 is configured as a guide groove; or the first guide rail connector 31 is configured as a guide groove, and the second guide rail connector 32 is configured as a guide rail. The specific selection may be set according to the actual application requirements.

It should be noted that the first guide rail connector 31 and the second guide rail connector 32 cooperate to perform the push-pull snap-fit action.

Please continue to refer to FIGS. 4-7.

In one embodiment, the lampshade assembly 1 comprises: a lamp panel 11, a light source 12, a lampshade 13, and an annular clip 14. The light source 12 is fixedly connected to the lamp panel 11 through a clip; the lampshade 13 is fixedly snap-fitted to the lamp panel 11 through the annular clip 14. The lamp panel 11 is made of acrylonitrile butadiene styrene copolymer (ABS) material; the lampshade 13 is made of polystyrene material.

Specifically, the lamp panel 11 has a push-pull structure with the lampshade 13, and is made of ABS material. A front surface of the lamp panel 11 is provided with a boss 1111 fixed to an aluminum substrate. A second surface 112 of the lamp panel is provided with a feature fixed to a connecting plate step, and is provided with a fixed light source connection wire. The light source 12 adopts a rectangular frame-shaped aluminum substrate (shaped like a Chinese character "hui"), which achieves the lighting effect while saving the cost of the aluminum substrate. The lampshade 13 is made of polystyrene (PS) material, which ensures the strength and the lighting effect. The annular clip 14 is used to fix the lampshade 13 and the lamp panel 11.

Figure 5:
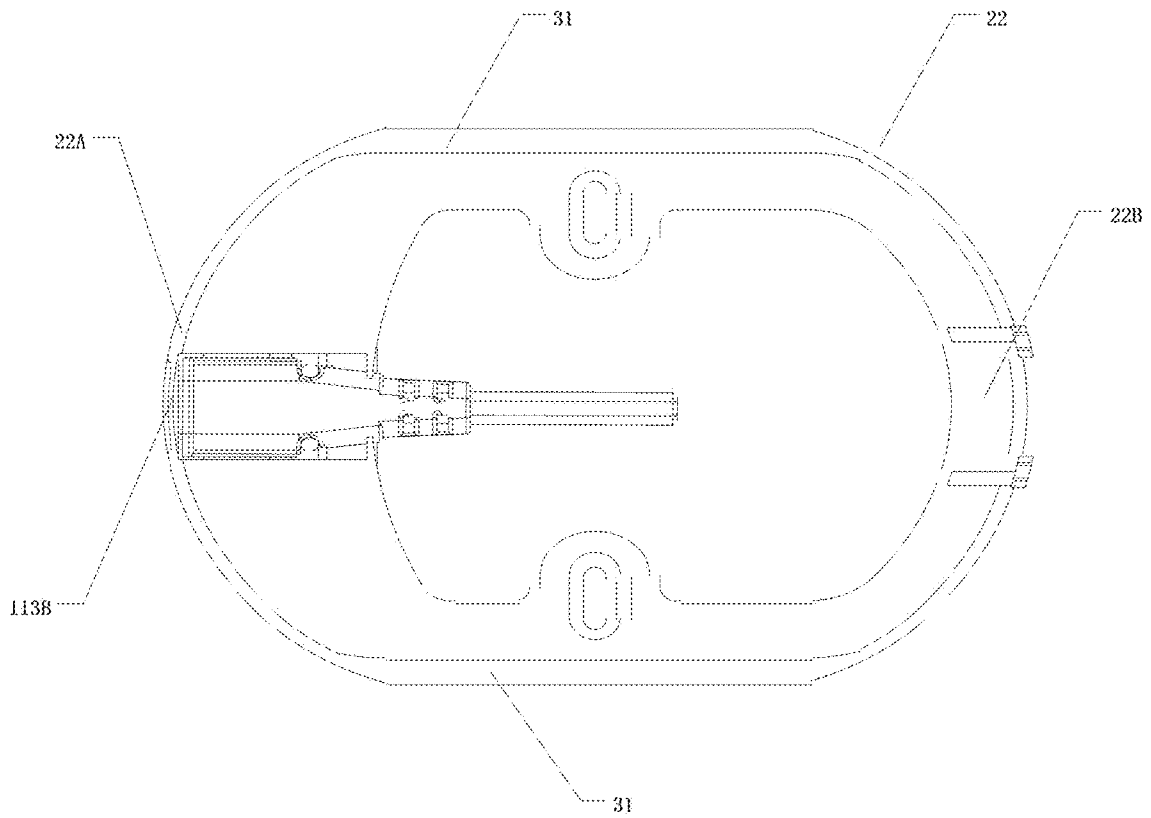
FIG. 5 is a bottom view of an appearance structure of a connecting plate according to one embodiment of the present disclosure.
Figure 6:
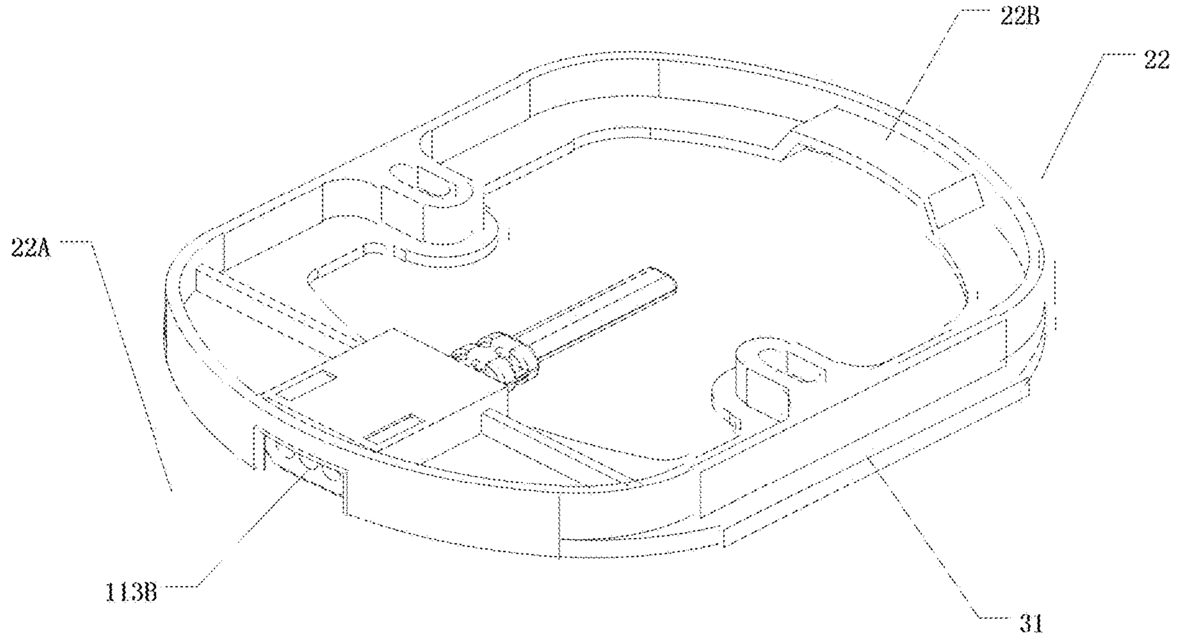
FIG. 6 is a top view of an appearance structure of a connecting plate according to one embodiment of the present disclosure.
Figure 7:
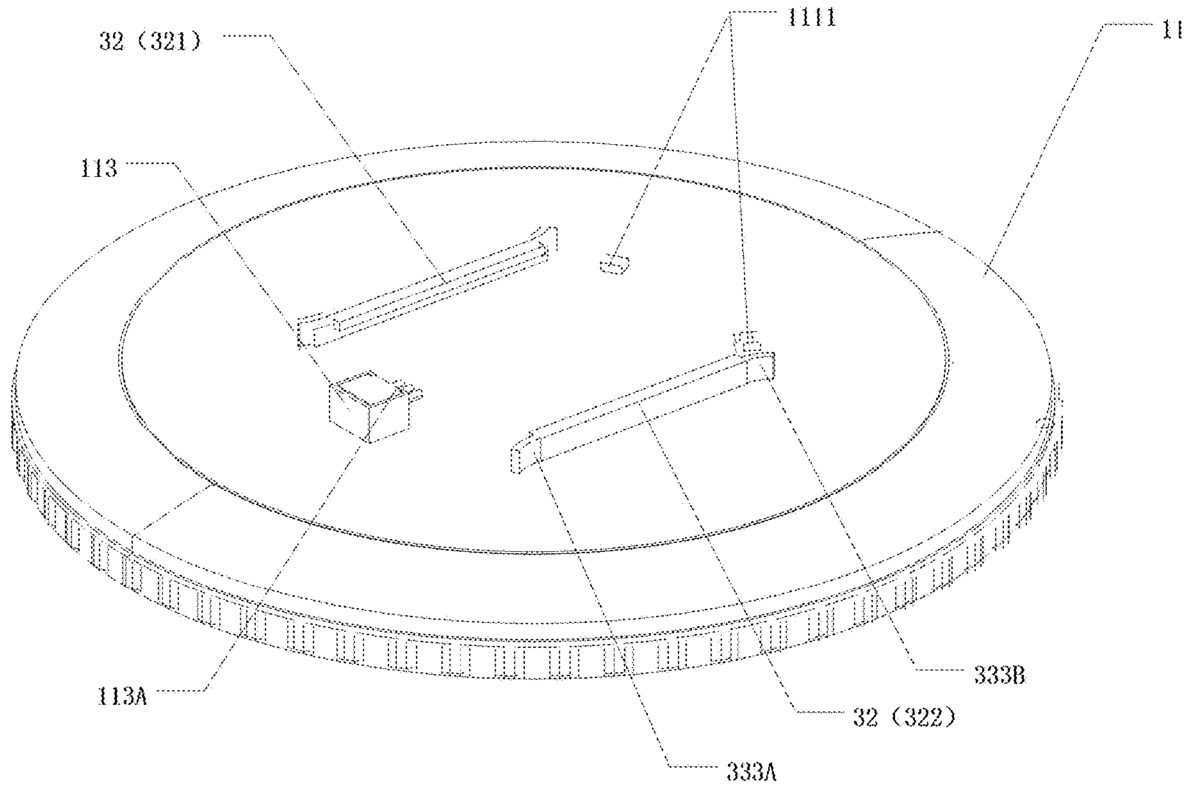
FIG. 7 is a top view of an appearance structure of a lamp panel according to one embodiment of the present disclosure.

Please continue to refer to FIGS. 5-7.

In one embodiment, male and female pins 113 are disposed on a first surface 111 of the lamp panel. The male and female pins 113 comprise: a first end of the male and female pins 113A and a second end of the male and female pins 113B. the first end of the male and female pins 113A and the second end of the male and female pins 113B are snap-fitted to each other.

Further, the first end of the male and female pins 113A is located at a first end of the second guide rail connector 32, and the second end of the male and female pins 113B is located at a first end of the connecting plate 22. The second guide rail connector 32 comprises a pair of a first guide rail 321 and a second guide rail 322. The first guide rail 321 and the second guide rail 322 are spaced apart to form a channel 322, and a first opening end of the channel 323 A is provided with the first end of the male and female pins 113A.

Specifically, the first end of the male and female pins 113A is located at the first opening end of the channel 323A formed by the first guide rail 321 and the second guide rail 322 (i.e., the first end of the male and female pins 113A is located at the first end of the second guide rail connector 333A); the second end of the male and female pins 113B is located at a first end of the connecting plate 22A. The first end of the male and female pins 113A is plugged into the second end of the male and female pins 113B on the connecting plate 22 to complete the fixed installation. Accordingly, the first end of the male and female pins 113A and the second end of the male and female pins 113B are both fixed and limited in position. Additionally, the connection between the first end of the male and female pins 113A and the second end of the male and female pins 113B enables electrical conductivity and power supply, and it also prevents wire misalignment and interference with other components.

In one embodiment, a boss 1111 is further provided on the first surface 111 of the lamp panel. At least one boss 1111 is provided. The boss 1111 is located at a second opening end of the channel 323B; the boss 1111 is fixedly snap-fitted to the second end of the connecting plate 22B. The boss 1111, the second guide rail connector 32, and the male and female pins 113 are all located on the same surface of the lamp panel 11.

In this embodiment, preferably, two bosses 1111 are provided.

Specifically, the two bosses 1111 are evenly distributed at the second opening end of the channel 323B (i.e., the bosses 1111 are located at a second end of the second guide rail connector 333B), and correspond to the position of the male and female pins 113. That is, the structure can form a quadrilateral space through the first guide rail 321, the second guide rail 322, the first end of the male and female pins 113A, and the bosses 1111. When the user mounts the lampshade assembly 1 and the motor assembly 2, the second guide rail connector 32 on the connecting plate 22 slides toward the first end of the male and female pins 113A along the position of the second guide rail connector 32 on the first surface of the lamp panel 111 (between the first guide rail 321 and the second guide rail 322, which are symmetrically positioned) until the first end of the male and female pins 113A is snap-fitted to the second end of the male and female pins 113B. Then, the second end of the connecting plate 22B is snap-fitted to the bosses 1111 at the second opening end of the channel, close to the first opening end of the channel 323A.

In one embodiment, the second surface of the lamp panel 11 is provided with a feature fixed to the connecting plate 22 and is provided with a fixed light source connection wire; the fixed light source connection wire is fixedly connected to the light source.

In one embodiment, the motor component 21 and the connecting plate 22 are fixedly connected through a connection pipe 23; the connecting plate 22 is disposed beneath the motor component 21 and fits closely against the upper surface of the lampshade assembly 1 to form a snap-fit connection with the lampshade assembly 1. The motor assembly 2 further comprises a controller extension wire 24. A clip 241 disposed at a terminal of the controller extension wire 24 is snap-fitted to a slot inside the connecting plate 22; a through step 25 is disposed outside of the connecting plate 22, and the through step 25 is fixedly connected with the second guide rail connector 32 on the upper surface of the lampshade assembly 1.

Specifically, the connecting plate 22 is disposed beneath the motor component 21, and the controller extension wire 24 is fixed to the connecting plate 22 through the clip 241. A through step 25 is provided outside the connecting plate 22 to fix the lampshade assembly 1 below.

That is to say, the motor component 21 is fixedly connected to the connecting plate 22 through the connection pipe 23, and the connection pipe 23 is a hollow structure. The hollow structure enables the controller extension wire 24 to pass through the connection pipe 23 to connect the controller extension wire 24 to a light source wire in the lampshade assembly 1. Meanwhile, the motor extension wire and the light source wire are respectively fixed to the connecting plate 22 and the lamp panel 11 through the clip 241, preventing the damage caused by unsecured, externally suspended extension wires in existing designs. In addition, the male and female pins are integrally injection-molded onto the corresponding plastic components (two pins, three pins, and more), eliminating poor wiring issues caused by manual pin insertion. The lampshade assembly 1 is fixed to the motor assembly 2 through a slide groove, eliminating the cumbersome installation and unstable limiting caused by the previous screw fixing or threaded fixing. Once the lampshade assembly 1 is properly installed, the male and female pins 113 automatically connect to establish an electrical connection, which significantly reduces the complexity of wiring and prevents issues related to poor electrical contact caused by wiring. Additionally, both the male and female ends are fixed and limited in position, which prevents wire misalignment and interference with other components.

The following is an explanation of the installation process of the push-pull plug-in lamp panel structure and the ceiling fan light comprising the structure as an example.

First, the light source is fixed to the front surface of the lamp panel through a melting column; then the lampshade is placed on the lamp panel through a limiting (or positioning) structure; then the lampshade and the lamp panel are fixed through the annular clip using interference fit. At this point, the lampshade assembly is mounted completely.

Then, the connecting plate is fixed to a motor shaft of the motor component through a nut; then, the motor extension wire and the light source wire are respectively fixed to the connecting plate and the lamp panel through the clip, preventing the damage caused by unsecured, externally suspended extension wires in existing designs.

Next, the first guide rail connector on the upper surface of the lampshade assembly is correspondingly snap-fitted to the second guide rail connector on the edge of the connecting plate, i.e., to slide along the channel formed by the first guide rail and the second guide rail. In this case, the first guide rail connector (i.e., the guide rail) is snap-fitted to the second guide rail connector (i.e., the guide groove) to slide along the channel until the second end of the male and female pins slides to the first end of the male and female pins. Then, it continues to slide so that the second end of the male and female pins is snap-fitted to the first end of the male and female pins. Then, as the male and female pins are snap-fitted, the connecting plate and the boss are also snap-fitted, so that the connecting plate and the lampshade assembly are firmly engaged. At this point, the motor assembly and the lampshade assembly are mounted as an integrated structure, and the installation operation is now completed.

Accordingly, it can be known that when the user mounts the lampshade assembly, the slot on the second surface of the lamp panel and the connecting plate step are mutually aligned and engaged, and the step is pushed forward to the fixed position for fixing. Meanwhile, the male and female pins on the connecting plate and the lamp panel are also connected to establish electrical contact. The second surface of the lamp panel has a guide opening to aid in alignment, facilitating easy installation. Once aligned and slid into place, the two bosses on the second surface of the lamp panel are snap-fitted to the connecting plate to prevent any backward movement, ensuring the fixed installation of both the lamp panel and the connecting plate. This also secures the male and female pins, allowing for a reliable electrical connection.

In summary, the push-pull plug-in lamp panel structure and the ceiling fan light comprising the structure provided by the present disclosure adopt the design of the push-pull snap-fit structure between the motor assembly and the lampshade assembly. This structure eliminates the need for additional wiring, effectively avoiding the complexity of screw-based installation and the risk of detachment in threaded installation, thus enabling easy installation and high overall strength. Furthermore, the motor extension wire and the light source wire are respectively fixed to the connecting plate and the lamp panel through the clips, preventing the damage caused by unsecured, externally suspended extension wires in existing designs, thereby ensuring the overall strength of the ceiling fan light and improving the service life of the ceiling fan light. The push-pull plug-in lamp panel structure provided in the present disclosure adopts the male and female pins, which are integrally molded into the corresponding plastic components (two-pin, three-pin, or more), effectively eliminating wiring issues caused by manual pin insertion. Once the lampshade assembly is properly installed, the male and female pins automatically connect to establish an electrical connection without the need for additional wiring, which significantly reduces the complexity of wiring and prevents issues related to poor electrical contact. Additionally, both the male and female connectors are fixed and limited in position, which prevents wire misalignment and interference with other components and improves the service life of the ceiling fan light. This design method of the present disclosure not only addresses the issue of cumbersome installation in traditional ceiling fan lights, but also resolves the problem of unstable connections.

The above embodiments are merely illustrative of the principles and effects of the present disclosure, and are not intended to limit the present disclosure. Those skilled in the art can modify or change the above embodiments without departing from the spirit and scope of the present disclosure. Therefore, all equivalent modifications or changes made by those skilled in the art without departing from the spirit and technical idea of the present disclosure should still be covered by the claims of the present disclosure.

The invention claimed is:

1. A push-pull plug-in lamp panel structure, comprising: a lampshade assembly and a motor assembly; wherein the motor assembly comprises: a motor component and a connecting plate;

the connecting plate is fixedly connected beneath the motor component, and the connecting plate is push-pull snap-fitted to the lampshade assembly; wherein a first guide rail connector is provided on an edge of the connecting plate, and a second guide rail connector corresponding to the first guide rail connector is provided on an upper surface of the lampshade assembly;

wherein the second guide rail connector of the lampshade assembly is push-pull snap-fitted to the first guide rail connector on the connecting plate, so that the motor assembly and the lampshade assembly are fixed and limited to each other;

wherein the lampshade assembly comprises a lamp panel, wherein male and female pins are provided on a first surface of the lamp panel; wherein the male and female pins comprise: a first end of the male and female pins and a second end of the male and female pins; wherein the first end of the male and female pins is located at a first end of the second guide rail connector, and the second end of the male and female pins are located at a first end of the connecting plate; wherein the second guide rail connector comprises a pair of a first guide rail and a second guide rail, the first guide rail and the second guide rail are spaced apart to form a channel; wherein a first opening end of the channel is provided with the first end of the male and female pins; wherein the first end of the male and female pins is snap-fitted to the second end of the male and female pins.

2. The push-pull plug-in lamp panel structure according to claim 1, wherein the lampshade assembly comprises: a light source, a lampshade, and an annular clip;

the light source is fixedly connected to the lamp panel through a clip;

the lampshade is fixedly snap-fitted to the lamp panel through the annular clip.

3. The push-pull plug-in lamp panel structure according to claim 2, wherein a second surface of the lamp panel is provided with a feature fixed to the connecting plate and is provided with a fixed light source connection wire;

the fixed light source connecting wire is fixedly connected to the light source.

4. The push-pull plug-in lamp panel structure according to claim 2, wherein the lamp panel is made of ABS material; and the lampshade is made of polystyrene material.

5. The push-pull plug-in lamp panel structure according to claim 1, wherein a boss is further provided on the first surface of the lamp panel; at least one boss is provided;

the boss is located at a second opening end of the channel;

the boss is fixedly snap-fitted to a second end of the connecting plate;

the boss, the second guide rail connector, and the male and female pins are all located on the same surface of the lamp panel.

6. The push-pull plug-in lamp panel structure according to claim 1, wherein: the first guide rail connector is configured as a guide rail, and the second guide rail connector is configured as a guide groove; or the first guide rail connector is configured as a guide groove, and the second guide rail connector is configured as a guide rail.

7. The push-pull plug-in lamp panel structure according to claim 1, wherein: the motor component and the connecting plate are fixedly connected through a connection pipe;

the connecting plate is disposed beneath the motor component and fits closely against the upper surface of the lampshade assembly to form a snap-fit connection with the lampshade assembly.

8. The push-pull plug-in lamp panel structure according to claim 7, wherein the motor assembly further comprises a controller extension wire;

a clip provided at a terminal of the controller extension wire is snap-fitted to a slot inside the connection plate;

a through step is provided outside the connecting plate, and the through step is fixedly connected to the second guide rail connector on the upper surface of the lampshade assembly.

9. A ceiling fan light, comprising: the push-pull plug-in lamp panel structure according to claim 1.

* * * * *